Figure 1:
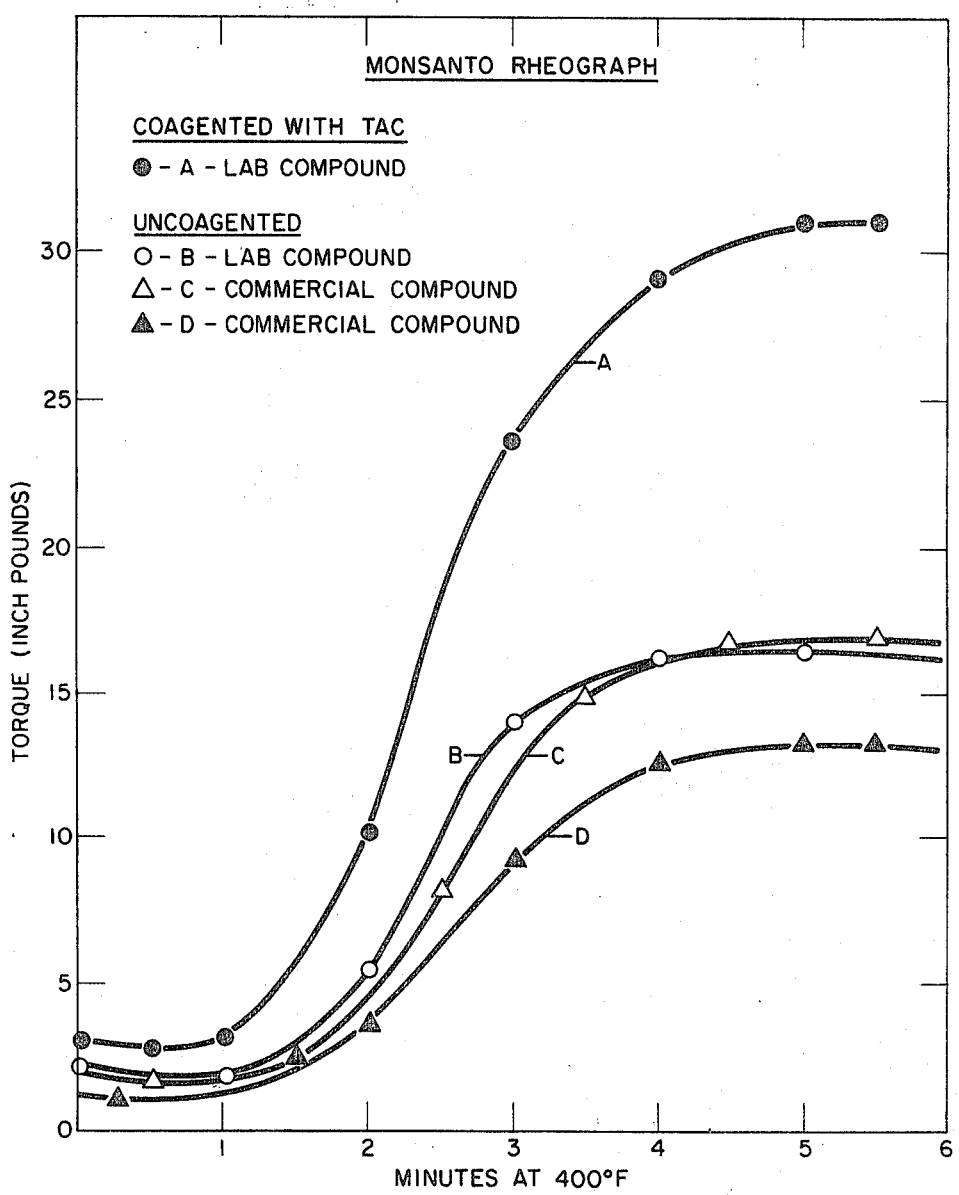
Figure 2:
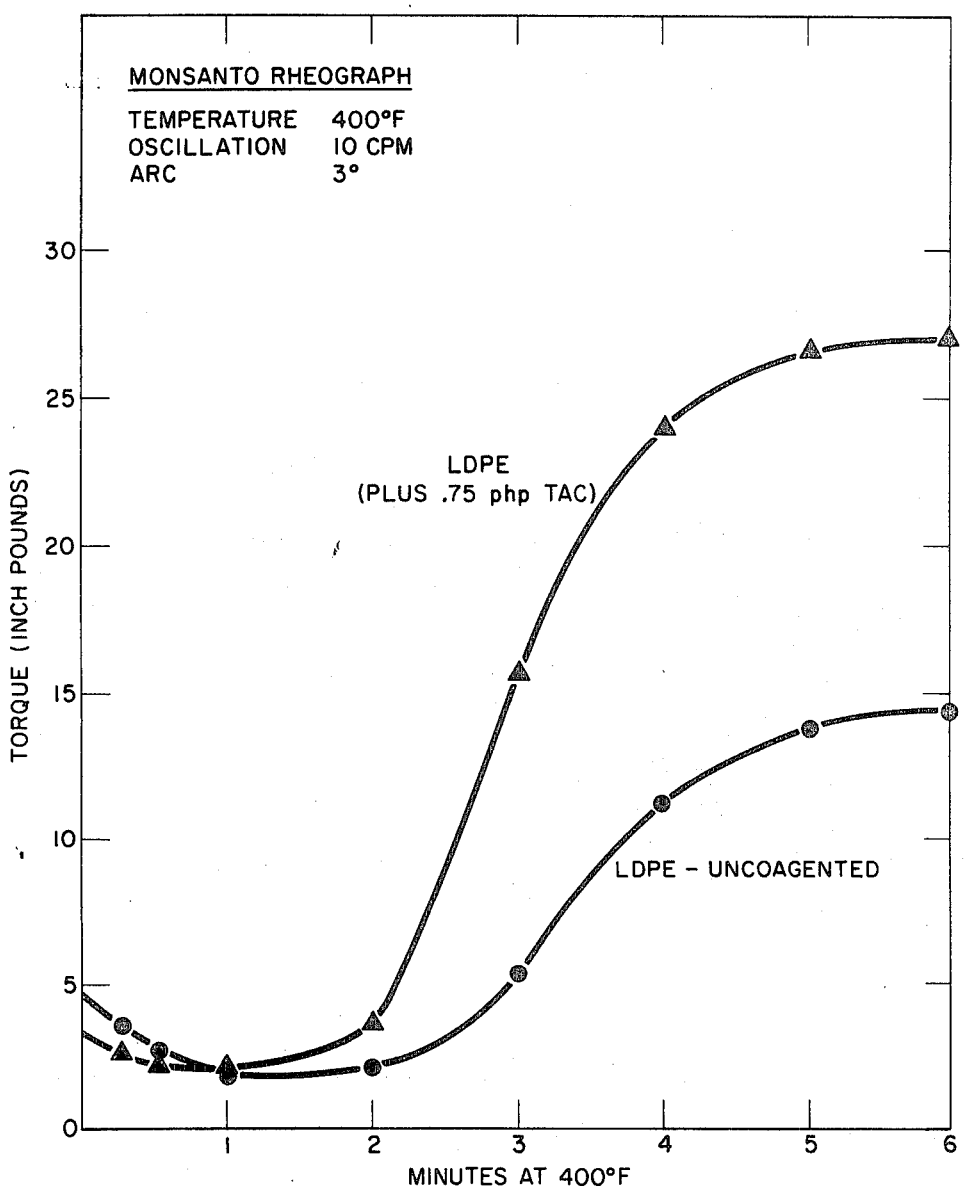

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 25, 1972

900 O.G. 1231

T900,019
POLYETHYLENE

John J. Murphy, Jr., 719 Springfield Ave., Cranford, N.J. 07016; Winthrope C. Smith, 430 Kimball Turn, Westfield, N.J. 07090; and William D. Marsh, 91 Cranford Ave., Cranford, N.J. 07016

Filed Apr. 19, 1971, Ser. No. 135,207
**Int. Cl. C08f *27/00, 29/04***
U.S. Cl. 260—878 R
2 Sheets Drawing. 17 Pages Specification

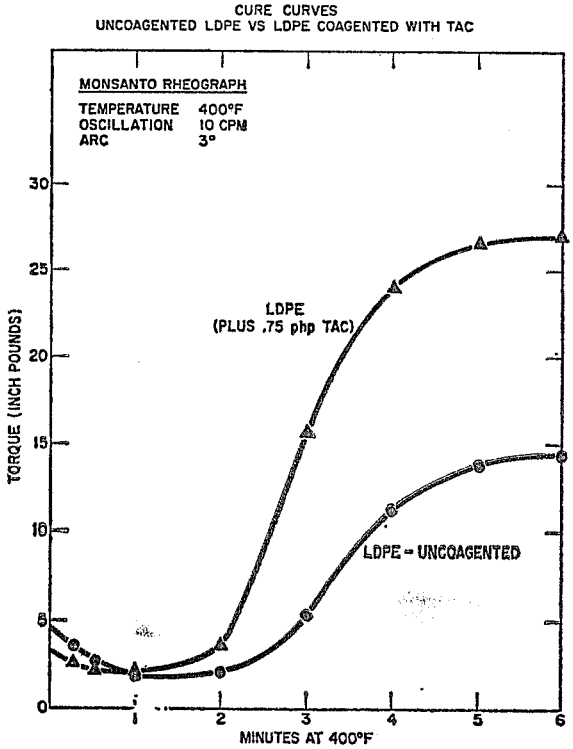

Peroxide cured polyethylene homo- and copolymers having improved physical properties, i.e. greatly reduced void formation and increased cure rate and state, are prepared by incorporation of minor amounts of EPDM's and/or coagents such as triallyl cyanurate, trimethylol propane trimethacrylate, ethylene dimethacrylate, m-phenylene bis maleimide, etc. These cured polymers are useful as electrical insulators, e.g. for high voltage wire and cable.

POLYETHYLENE

Filed April 19, 1971 2 Sheets-Sheet 1

IMPROVEMENT IN LDPE CURE WITH TAC

John J. Murphy, Jr.
Winthrope C. Smith INVENTORS
William D. Marsh

BY Harold Einhorn ATTORNEY

CURE CURVES
UNCOAGENTED LDPE VS LDPE COAGENTED WITH TAC

*John J. Murphy, Jr.*
*Winthrope C. Smith* INVENTORS
*William D. Marsh*

BY Harold Einhorn ATTORNEY